3,202,611
CAPACITOR ELECTROLYTE

Roy A. Canty and Rudolph G. Griffin, Palo Alto, Calif., assignors to International Telephone and Telegraph Corporation, Nutley, N.J., a corporation of Maryland
No Drawing. Filed Dec. 13, 1962, Ser. No. 244,294
5 Claims. (Cl. 252—62.2)

This invention relates to electrolytes for utilization in tantalum electrolytic capacitors.

Heretofore, tantalum capacitors have been provided with electrolytes such as sulphuric acid in a gel form. A gelling agent, such as silica gel, which is not adversely affected by the electrolyte has been used with good effect. The silica gel is incorporated into the electrolyte as ethyl silicate which hydrolyzes to a gel of silicic acid. Such an electrolyte is often termed an immobilized electrolyte. The electrolyte in the immobilized or gel form permits the manufacture of tantalum capacitors having uniform characteristics and, during use in electrical circuits, the immobilized electrolyte prevents the formation of an asymmetrical conducting film on the capacitor cathode.

One significant drawback to the use of such gel electrolytes, however, is that the ethyl silicate must first be incorporated into the acid electrolyte where if it is subjected to precise temperature conditions it will hydrolyze into a desired gel form. The gel must then be dispensed in the gelled form into each individual capacitor with problems arising because of the viscosity of the gel, possible non-uniformity of acid concentration and formation of air bubbles in the electrolyte. Another significant drawback to the use of gelled electrolyte is the fact that carefully controlled conditions are required to effect a proper cure of the gel. Any variation in required conditions, of course, affects the reproducibility of characteristics which in turn militates against the use of production line techniques.

It is, therefore, an object of this invention to provide a semi-solid electrolyte which overcomes the disadvantages of such prior art gel electrolytes.

It is also an object of this invention to provide an improved electrolyte which permits the manufacture of tantalum capacitors having longer life, reduced leakage and improved stability.

A further object is to provide a semi-solid electrolyte which can be dispensed into an individual capacitor in flowable form.

A feature of this invention is the incorporation of submicroscopic particulate silica into an acid such as sulphuric acid which provides a thixotropic electrolyte.

A further feature of this invention is the utilization of particulate silica and sulphuric or other suitable acid in the proportion of 5 to 8% by weight of silica to 92 to 95% acid solution.

These and other objects and features of the invention will become more clear when it is considered in connection with the following description.

A "thixotropic" fluid is one whose viscosity is inversely proportional to the amount of shear applied to the fluid as by stirring, mixing and the like. In other words, the ability of such fluids to flow is directly proportional to the amount of shear applied.

Generally speaking, the present invention comprises a novel semi-solid electrolyte which may be incorporated into tantalum capacitors and more specifically a thixotropic electrolyte consisting of a mixture of particulate silica and acid in specific proportions hereinafter more fully described.

A thixotropic electrolyte, in accordance with the present invention and suitable for use in tantalum capacitors, may be obtained by mixing particulated silica and a suitable acid in the following proportions: 5 to 8% by weight of silica to 92 to 95% solution of sulphuric acid or other suitable acid such as hydrochloric acid. No precise temperature conditions or curing steps are required as in the case of "gel" electrolytes.

One form of silica utilized in the practice of this invention is of extremely fine particle size. Good results were obtained utilizing silica having particle sizes in a 0.015 to 0.020 micron range. The silica utilized is neither gelatinous nor porous and is characterized by the fact that it has no internal surface area. The particulated silica utilized in this invention therefore, may be distinguished from silica gels and aerogels, in which over 90% of the available surface area is internal.

In the preparation of electrolytes suitable for use in electrolytic capacitors, it has been noted that certain mixtures of silica and acid are more appropriate depending upon the voltage range at which the capacitors in which the electrolyte is to be incorporated are to be operated. Thus, it has been found that, for operating voltages of 60 volts and less, the proportions of silica to sulphuric acid should be 6% by weight of the total sulphuric acid-water solution, which solution contains 38% sulphuric acid. For operating voltages of 61 volts and above, it has been found that the proportions of silica to sulphuric acid should be 7% by weight of the total sulphuric acid-water solution, which solution contains 21% sulphuric acid.

The semi-solid electrolyte resulting from any of the above-mentioned mixtures may be introduced into tantalum capacitors of the kind well known to those skilled in the art. Briefly, such capacitors consist of an electrode of porous tantalum which acts as an anode and is disposed in a container of copper, or alternatively, a container of copper the internal surface of which is plated with non-porous silver. The semi-solid electrolyte is disposed between the anode and cathode and is in intimate contact with the surfaces of these electrodes. A suitable seal or closure to prevent leakage is also incorporated in such capacitors.

Tantalum capacitors utilizing a semi-solid electrolyte in accordance with the teaching of this invention have improved stability and electrolyte leakage is reduced thereby providing longer life under normal operating conditions. The use of the thixotropic electrolyte also permits improved operation over relatively wide variations in temperature. Because of the extremely fine size of the silica used in the electrolyte mixture, improved area wetting action has been obtained over wide ranges of operating temperature. Further, the use of the particulate silica permits improved use of cathode surface area by reducing the possibility of the formation of air bubbles during manufacture. After assembly of the tantalum capacitors utilizing the electrolyte of this invention, it has been noted that under relatively wide variations in temperature that there is considerably less expansion of the electrolyte volume due to the fact that the silica changes relatively little in volume with variations in temperature. Finally the use of the thixotropic electrolyte provides higher conductivity with a consequent increase in expected lifetime.

While we have described above the principles of our invention in connection with specific examples, it is to be clearly understood that this description is made only by way of example and not as a limitation to the scope of our invention as set forth in the objects thereof and in the accompanying claims.

We claim:

1. A thixotropic electrolyte for use in electrolytic capacitors consisting essentially of a mixture of particulate silica in the .015–.020 micron range and a solution of acid, said acid mixture containing 5–8% by weight of particulate silica to 92–95% by weight of acid solution.

2. A thixotropic electrolyte according to claim 1 wherein the acid is sulphuric acid.

3. A thixotropic electrolyte according to claim 1 wherein the acid is hydrochloric acid.

4. A thixotropic electrolyte for tantalum capacitors, said tantalum capacitors being operable in a voltage range of 60 volts and less, consisting essentially of a mixture of particulate silica in the .015–.020 micron range and a dilute solution of acid, said silica representing 6% by weight of the acid solution and said acid solution containing 38% sulphuric acid.

5. A thixotropic electrolyte for tantalum capacitors, said tantalum capacitors being operable in a voltage range of 61 volts and above, consisting essentially of a mixture of particulate silica in the .015–.020 micron range and a dilute solution of acid, said silica representing 7% by weight of the acid solution and said acid solution containing 21% sulphuric acid.

References Cited by the Examiner

UNITED STATES PATENTS

| | | | |
|---|---|---|---|
| 2,169,122 | 8/39 | Crew | 23—182 |
| 2,257,467 | 9/41 | Jacobson | 252—145 |
| 2,863,727 | 12/58 | Thornhill et al. | 23—182 |
| 2,879,136 | 3/59 | Maloney | 23—182 |
| 2,910,633 | 10/59 | Hovey | 252—62.2 |
| 2,937,149 | 5/60 | Hilton | 252—145 |

OTHER REFERENCES

Mellor: Comprehensive Treatise etc., vol. 6, publ. by Longmans, Green and Co., 1925, pages 277–279.

Rose: The Condensed Chemical Dictionary, Reinhold Pub. Corp., 1961, page 192, "Cab-O-Sil."

TOBIAS E. LEVOW, *Primary Examiner.*

MAURICE A. BRINDISI, *Examiner.*